(12) United States Patent
Lee

(10) Patent No.: US 7,561,210 B2
(45) Date of Patent: *Jul. 14, 2009

(54) VARIABLE-FIELD MOTION DETECTOR

(75) Inventor: Yuan-Chung Lee, Tai-Nan (TW)

(73) Assignee: Mediatek Inc., Hsin-Chu (TW)

( * ) Notice: Subject to any disclaimer, the term of this patent is extended or adjusted under 35 U.S.C. 154(b) by 49 days.

This patent is subject to a terminal disclaimer.

(21) Appl. No.: 11/850,682

(22) Filed: Sep. 6, 2007

(65) Prior Publication Data

US 2007/0296856 A1    Dec. 27, 2007

Related U.S. Application Data

(62) Division of application No. 10/710,871, filed on Aug. 9, 2004, now Pat. No. 7,286,186.

(30) Foreign Application Priority Data

Aug. 11, 2003 (TW) .............................. 92121982 A (51) Int. Cl.
  *H04N 5/14* (2006.01)
  *H04N 9/64* (2006.01)
(52) U.S. Cl. ................... 348/701; 348/702; 348/452
(58) Field of Classification Search ......... 348/609–702, 348/451, 452, 448, 441
See application file for complete search history.

(56) References Cited

U.S. PATENT DOCUMENTS

| 4,626,891 | A | * | 12/1986 | Achiha ....................... 348/702 |
| 6,160,586 | A | | 12/2000 | Justiss |
| 6,340,990 | B1 | * | 1/2002 | Wilson ....................... 348/448 |
| 6,452,639 | B1 | | 9/2002 | Wagner |
| 6,630,961 | B1 | | 10/2003 | Shin |
| 6,784,942 | B2 | | 8/2004 | Selby |
| 6,822,691 | B1 | | 11/2004 | Kim |
| 7,227,579 | B2 | | 6/2007 | Bakker |
| 2007/0296857 | A1 | * | 12/2007 | Lee ............................ 348/452 |

OTHER PUBLICATIONS

Utilization of Motion Detection Information for System Resource Management in a Multi-media Environment; Mar. 1, 1992; IBM Technical Disclosure Bulletin, Mar. 1992, US; vol. No. 34; Issue No. 10B, p. 119-121.

* cited by examiner

*Primary Examiner*—M. Lee
(74) *Attorney, Agent, or Firm*—Winston Hsu (57) ABSTRACT

The present invention discloses a variable-field motion detector having access to a plurality of video fields of an interlaced video signal for detecting a motion situation of an image area in the interlaced video signal. The variable-field motion detector includes: a plurality of pixel difference circuits each for computing a detection value according to the difference between the pixel values of a single pixel in two different video fields; a decision circuit coupled to the pixel difference circuits for determining the motion situation of the image area according to the detection values; and a field-number adjuster for adjusting the pixel difference circuits and/or the decision circuit to eliminate the effect of some video fields according to a detection number.

8 Claims, 9 Drawing Sheets

| Available memory bandwidth | Detection number |
|---|---|
| Available memory bandwidth >=213MB/s | 6 |
| 213MB/s>Available memory bandwidth >=177.5MB/s | 5 |
| 177.5MB/s>Available memory bandwidth >=142MB/s | 4 |
| 142MB/s>Available memory bandwidth >=106.5MB/s | 3 |
| 106.5MB/s>Available memory bandwidth | 2 |

Fig. 6

| User-selectable operation mode | Detection number |
| --- | --- |
| Letterbox | 3 |
| Pan-scan | 6 |
| NTSC-to-PAL | 5 |
| PAL-to-NTSC | 4 |
| Zoom in | 6 |
| Zoom out | 2 |

VARIABLE-FIELD MOTION DETECTOR

CROSS REFERENCE TO RELATED APPLICATIONS

This divisional application claims the benefit of U.S. patent application Ser. No. 10/710,871, filed on Aug. 09, 2004 and included herein by reference.

BACKGROUND

The invention relates to a scalable video format conversion system, and more particularly, to a system which dynamically determines how many video fields are used in motion detection process when converting an interlaced video signal into a progressive video signal.

Generally speaking, there are two kinds of video signal, one is progressive video signal, and the other is interlaced video signal. In a progressive video signal, a video frame comprises all points (or pixels) of the image at any given sampling time. In an interlaced video signal, a video field comprises only half the pixels of the image at any given sampling time, and another video field at the next sampling time comprises the remaining half of the pixels. The advantage of interlaced scanning is that a high field rate can be achieved. However, when an interlaced video signal must be played on a progressive display device (such as a computer monitor), the interlaced video signal must be converted into a progressive video signal through "interlaced to progressive conversion".

Conventional systems use a dedicated video format conversion chip to process video format conversion. The calculation requirements, the memory volume requirements, and the memory bandwidth requirements are roughly fixed, hence it does not require complex system resources management. With the advances of modern computer systems, some chips with integrated video processing capabilities are proposed. System resources management therefore becomes more and more complicated. A simple solution is to sufficiently design the system for handling the strictest situation. However, systems sufficient for handling the strictest situation cost much, and the strictest situation is not the most regular case. The drawback is that the system resources will not be used efficiently.

In U.S. Pat. No. 6,452,639 disclosed by Wagner, a de-interlacing method for dynamically determining which interpolation algorithm being used according to the state of system resources is proposed. With the method, when system resources are plentiful, the system uses a more complex interpolation algorithm, and when system resources are sparse, the system uses a simpler interpolation algorithm.

However, using the motion-adaptive de-interlacing method is the most efficient way to process interlaced to progressive conversion. The motion-adaptive de-interlacing method generally includes two steps. The first step involves processing motion detection, which means detecting a motion situation by checking a fix number of video fields of the interlaced video signal. Then, the second step involves selecting a proper interpolation algorithm according to the detected motion situation.

Figure 1:
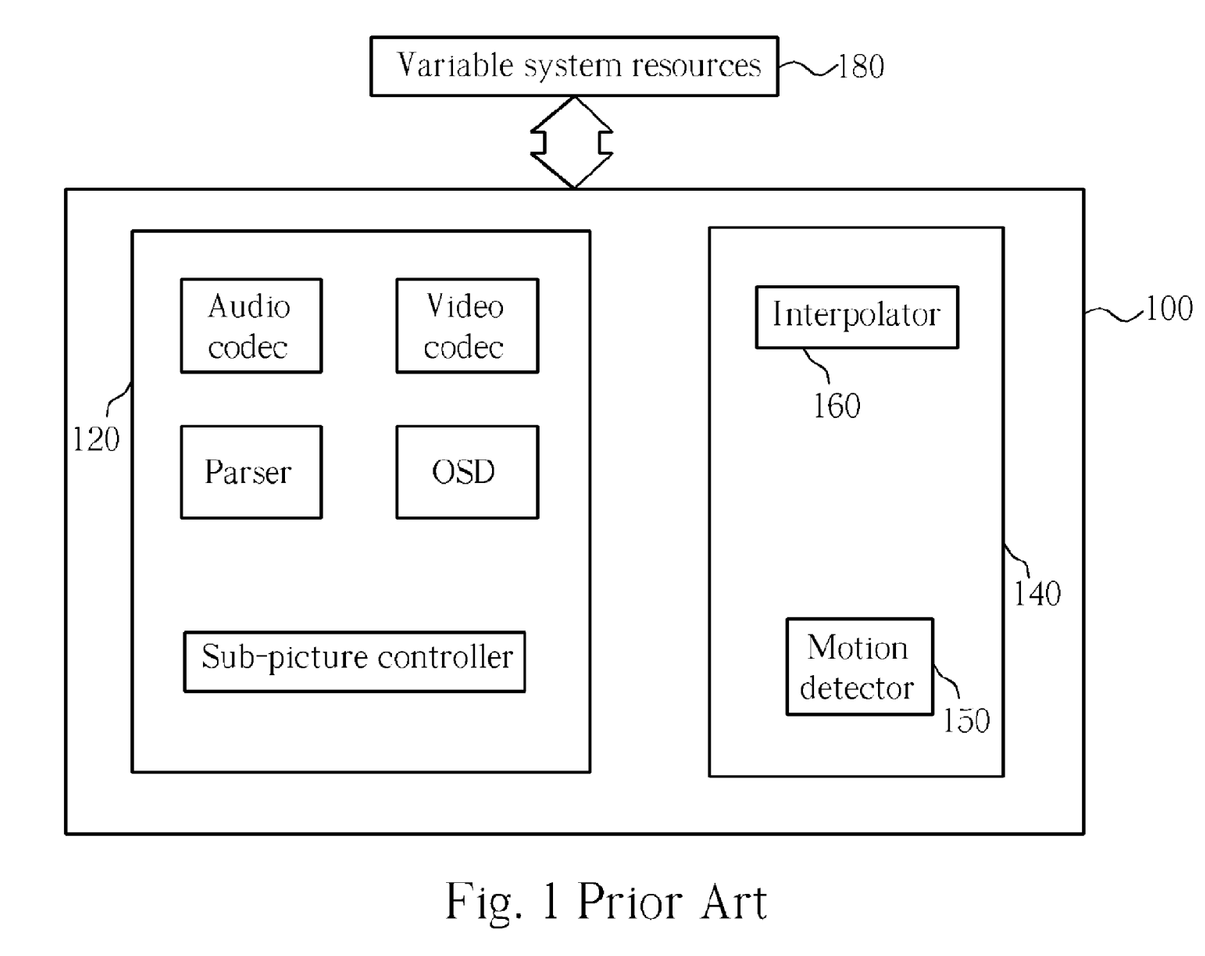
FIG. 1 shows a block diagram of a conventional video format conversion system.

FIG. 1 shows a conventional video format conversion system. In FIG. 1, the video format conversion system 100 is a single chip containing an MPEG codec circuit 120 and a video format conversion circuit 140. The video format conversion system 100 utilizes the variable system resources 180 (including memory bandwidth, memory capacity, etc.) to process MPEG encoding/decoding and video format conversion. The video format converter 140 includes a motion detector 150 and an interpolator 160. The motion detector 150 determines a motion situation by checking a fix number of video fields in an interlaced video signal. The interpolator 160 converts the interlaced video signal into a progressive video signal with a chosen interpolation algorithm, which is chosen according to the motion situation.

Figure 2:
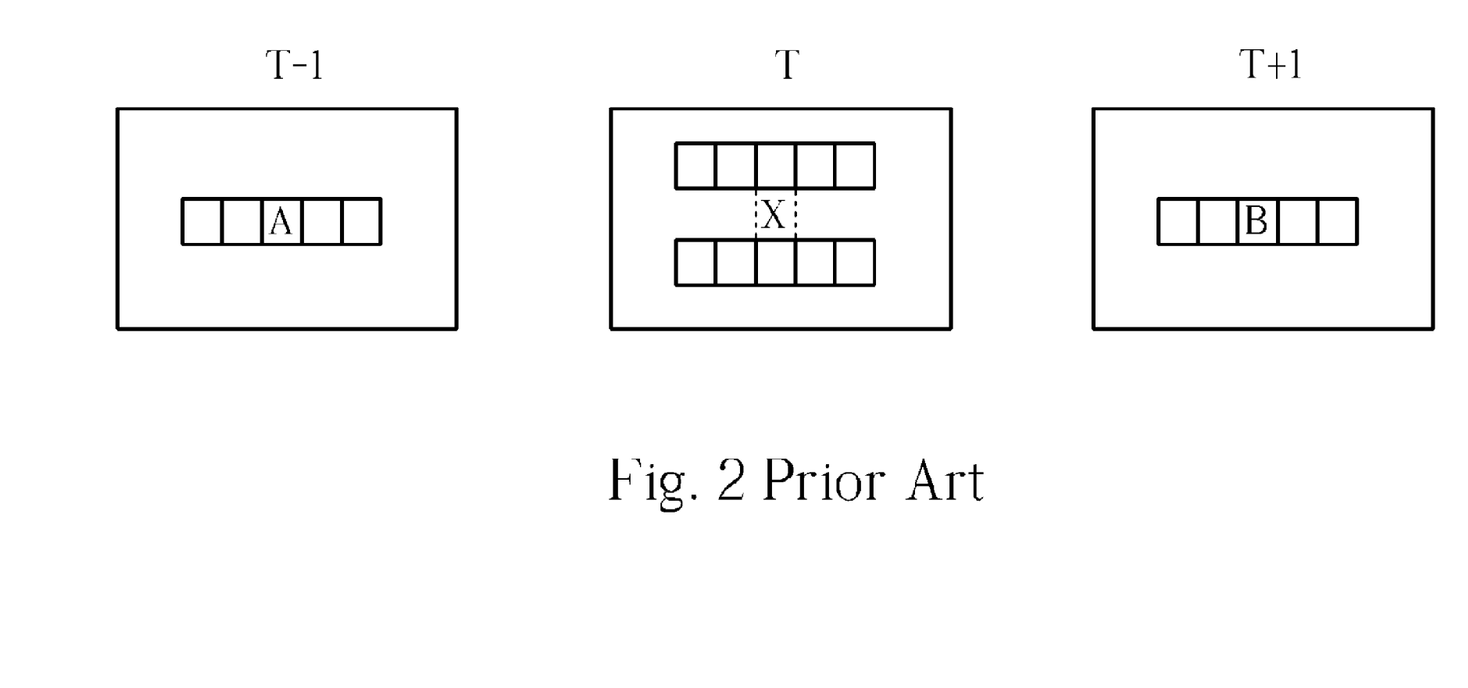
FIG. 2 shows an example illustrating 3-field motion detection.

In motion detection process, in actuality, the number of utilized video fields does not have to be fixed. Generally, the number of utilized video fields ranges from 2 to 6 fields (or even more than 6 fields). The more fields are utilized, the more accurate the detected motion situation will be. However, more system resources will be consumed when more video fields are utilized. FIG. 2 shows an example of 3-field motion detection. For determining the motion situation of an interpolating point X in field T, the 3-field motion detection finds the difference between the pixel value of point A in field T−1 and the pixel value of point B in field T+1, then uses a threshold to distinguish the result between static and dynamic. When |A-B|>threshold, the result is dynamic; when |A-B|<threshold, the result is static. The system can select a proper interpolation algorithm according to whether the result is dynamic or static.

Figure 3:
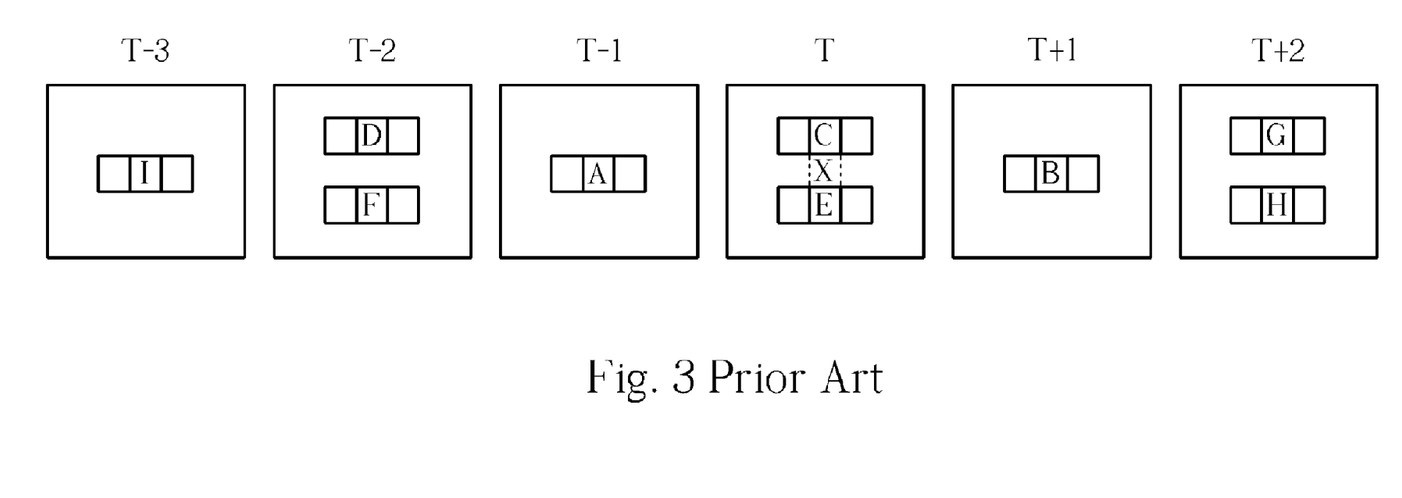
FIG. 3 shows an example illustrating 6-field motion detection.

FIG. 3 shows an example of 6-field motion detection. The point X in field T is the interpolated point. When |A-B|>threshold or |C-D|>threshold or |E-F|>threshold or |C-G|>threshold or |E-H|>threshold or |A-L|>threshold, the result is dynamic, otherwise the result is static. The situation shown in FIG. 3 is only an example. The used fields for motion detection process can be from T−3 to T+2, from T−2 to T+3, or other successive 6 fields.

As mentioned above, when more video fields are utilized in motion detection process, the more system resources will be consumed. However, in the prior art as shown in FIG. 1, conventional video format conversion system does not determine the number of video fields used in motion detection process dynamically according to the availability of variable system resources. That is, the system does not always use the best motion detection method acceptable to the available system resources at any given time. The draw back of the above mention situation is that the system resources are not used efficiently.

SUMMARY

It is therefore an objective of the present invention to provide a scalable video format conversion system that can dynamically determine the number of video fields used in motion detection process according to the situation of system resources to solve the above-mentioned problems.

According to an embodiment of the present invention, a variable-field motion detector having access to a plurality of video fields of an interlaced video signal for detecting a motion situation of an image area in the interlaced video signal is provided. The variable-field motion detector includes: a plurality of pixel difference circuits each for computing a detection value according to the difference between the pixel values of a single pixel in two different video fields; a decision circuit coupled to the pixel difference circuits for determining the motion situation of the image area according to the detection values; and a field-number adjuster for adjusting the pixel difference circuits and/or the decision circuit to eliminate the effect of some video fields according to a detection number.

It is an advantage of the present invention that the disclosed variable-field motion detection apparatus dynamically selects a proper detection number according to the availability of system resources and the status of the scalable video format conversion system. Hence the system resources will be used more efficiently, and better video effects can be achieved.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
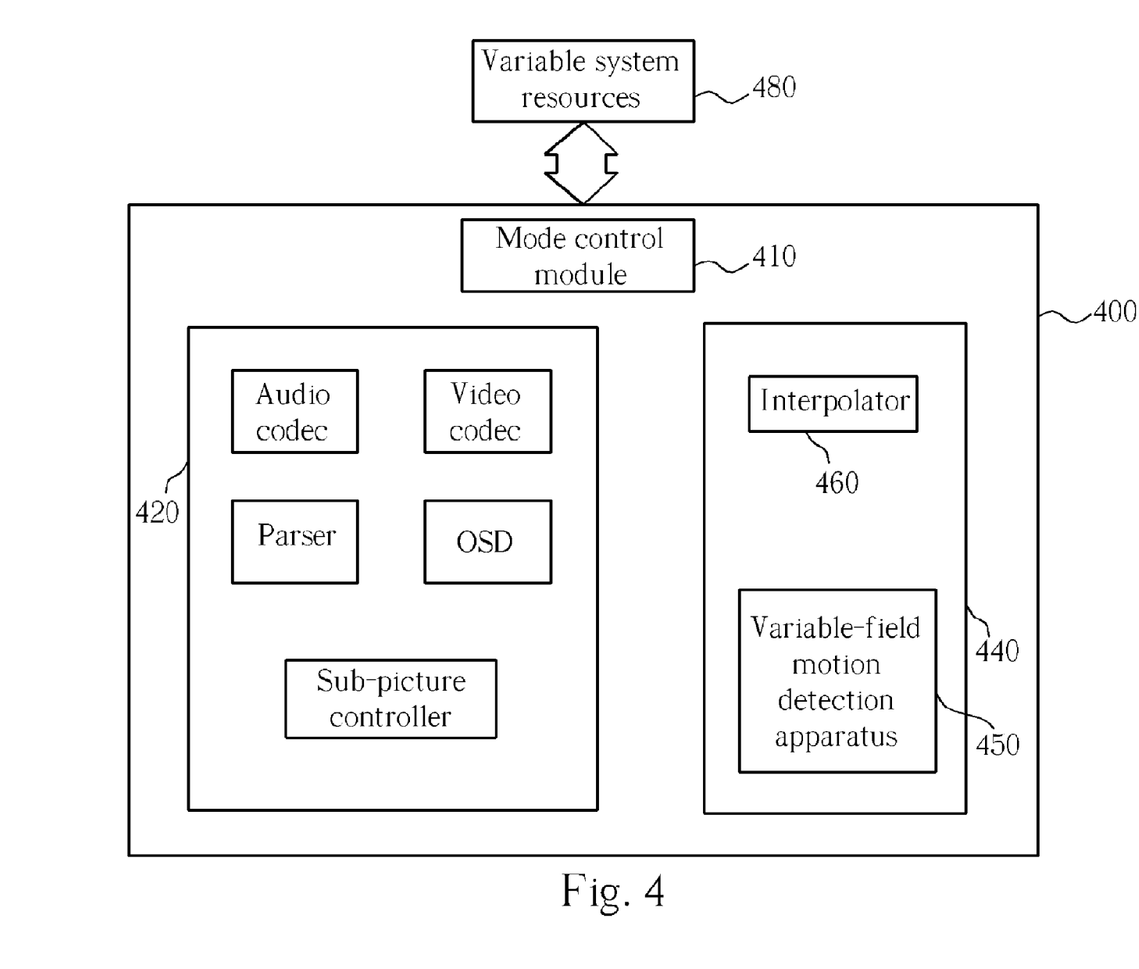
FIG. 4 shows an embodiment of a scalable video format conversion system according to the present invention.

FIG. 4 shows an embodiment of a scalable video format conversion system according to the present invention. In this embodiment, the scalable video format conversion system 400 is implemented in a single chip 400 having both MPEG encoding/decoding capability and video format conversion capability. The variable system resources 480 (such as memory, memory bandwidth, etc.) are shared by an MPEG codec circuit 420 and a scalable motion-adaptive de-interlacing system 440 of the single chip 400. When converting an interlaced video signal into a progressive video signal, the scalable motion-adaptive de-interlacing system 440 accesses a plurality of video fields to determine a motion situation of an image area. The number of the plurality of video fields accessed by the scalable motion-adaptive de-interlacing system 440 is equal to a detection number, and the detection number is dynamically determined by a mode control module 410 according to the availability of the system resources 480 and/or the status of the scalable video format conversion system 400. In the scalable motion-adaptive de-interlacing system 440, a variable-field motion detection apparatus 450 handles the motion detection process. After the motion situation is determined, an interpolator 460 chooses a proper interpolating algorithm to convert the interlaced video signal into the progressive video signal.

Figure 5:
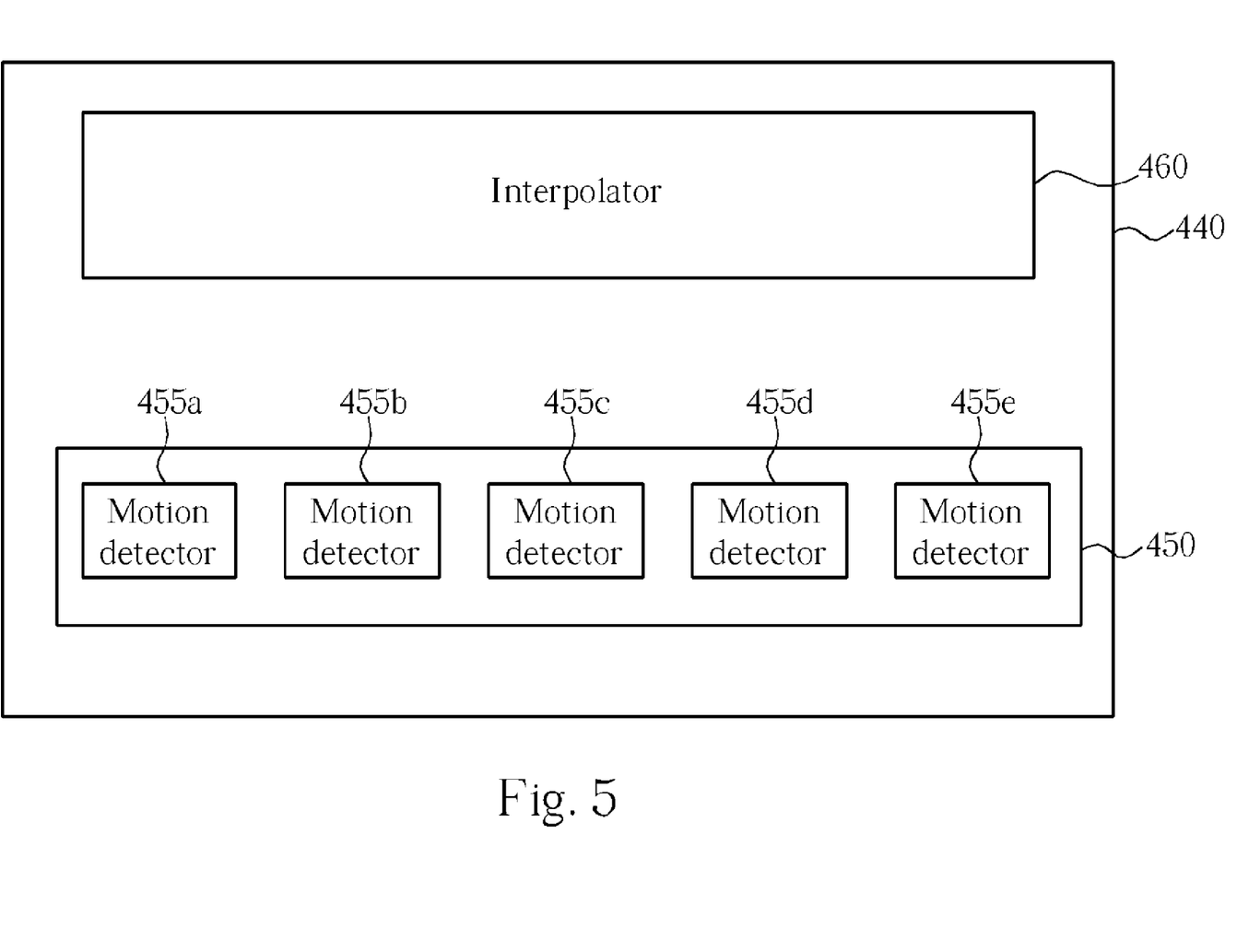
FIG. 5 shows a block diagram of the scalable motion-adaptive de-interlacing system of FIG. 4.

FIG. 5 shows a block diagram of the scalable motion-adaptive de-interlacing system 440. In the embodiment shown in FIG. 5, the variable-field motion detection apparatus 450 includes five motion detectors 455a-e. Each of the motion detectors 455a-e implements motion detection process with a specific number of video fields. The detection number determined by the mode control module 410 will decide which of the motion detectors 455a-e will be used. For example, when the detection number determined by the mode control module 410 is six, the motion detector 455e will be used to implement motion detection process. When the detection number is four, the motion detector 455c will be used to implement motion detection process. As mention above, the interpolator 460 selects a proper interpolation algorithm according to the motion situation detected by the variable-field motion detection apparatus 450. Please note that, in this embodiment, each motion detector 455a-e handles motion detection process with a specific number of video fields. However, it is also possible that the variable-field motion detection apparatus 450 handles motion detection process with different numbers of video fields by itself, rather than containing five motion detectors. Such apparatus will be discussed in more detail later.

Figure 6:
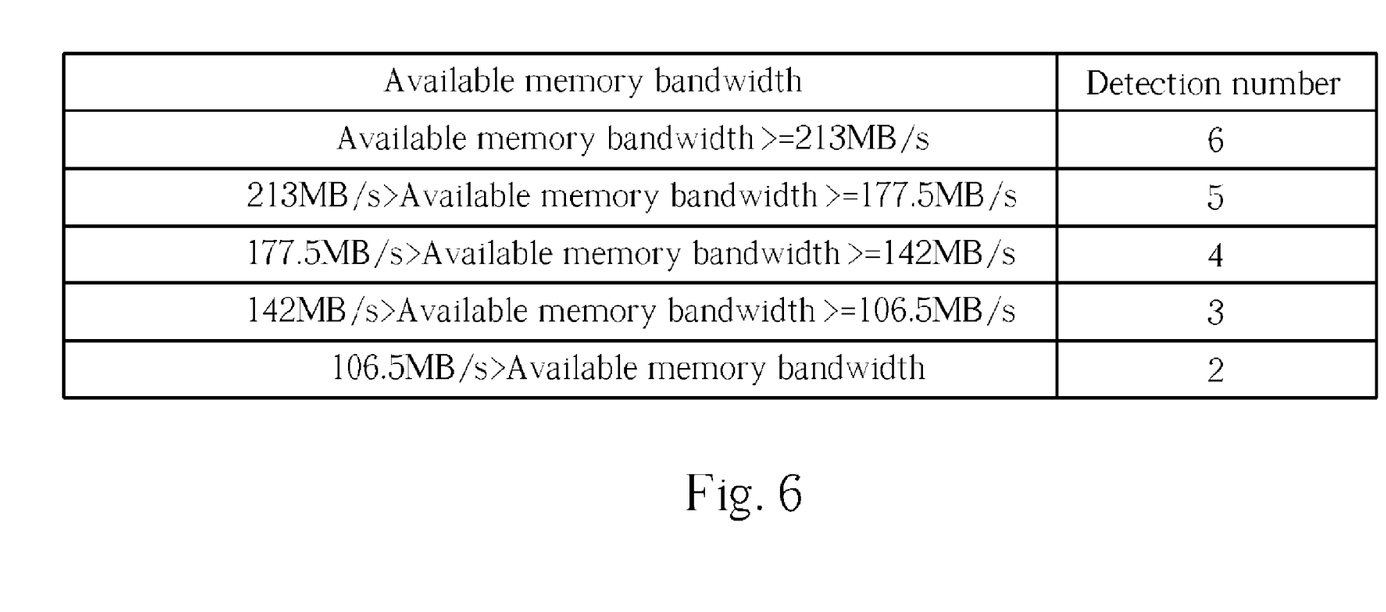
FIG. 6 shows a lookup table for determining the detection number according to the available memory bandwidth.

As mentioned above, the mode control module 410 determines the detection number according to the availability of the system resources 480 and/or the status of the scalable video format conversion system 400. For example, the availability of the system resources 480 can be determined according to the computational power of the scalable video format conversion system 400, the available space in a memory (not shown) of the system resources 480, the available memory bandwidth, or the limitation of power consumption, etc. When the availability of the variable system resources 480 shows that there are abundant available system resources, the mode control module 410 will set the detection number larger; when the availability of the variable system resources 480 shows that there are only sparse available system resources, the mode control module 410 will set the detection number smaller. Taking memory bandwidth as example, the table shown in FIG. 6 is a lookup table for determining the detection number according to the available memory bandwidth. It is noted that the lookup table shown in FIG. 6 is only illustrative and not limiting.

Further, the status of the scalable video format conversion system 400 can be determined according to the bit rate of a video bit-stream or an audio bit-stream, the data processing rate of a video codec or an audio codec, the work load of a parser, the display or decoding load of a sub-picture controller, the display workload of an on-screen-display controller (OSD), or the user-selectable operation mode, etc. When the status of the scalable video format conversion system 400 shows that there are still abundant system resources for the scalable motion-adaptive de-interlacing system 440 to use, the mode control module 410 could set the detection number larger. When the status of the scalable video format conversion system 400 shows that there are only sparse system resources left for the scalable motion-adaptive de-interlacing system 440 to use, the mode control module 410 could set the detection number smaller.

Figure 7:
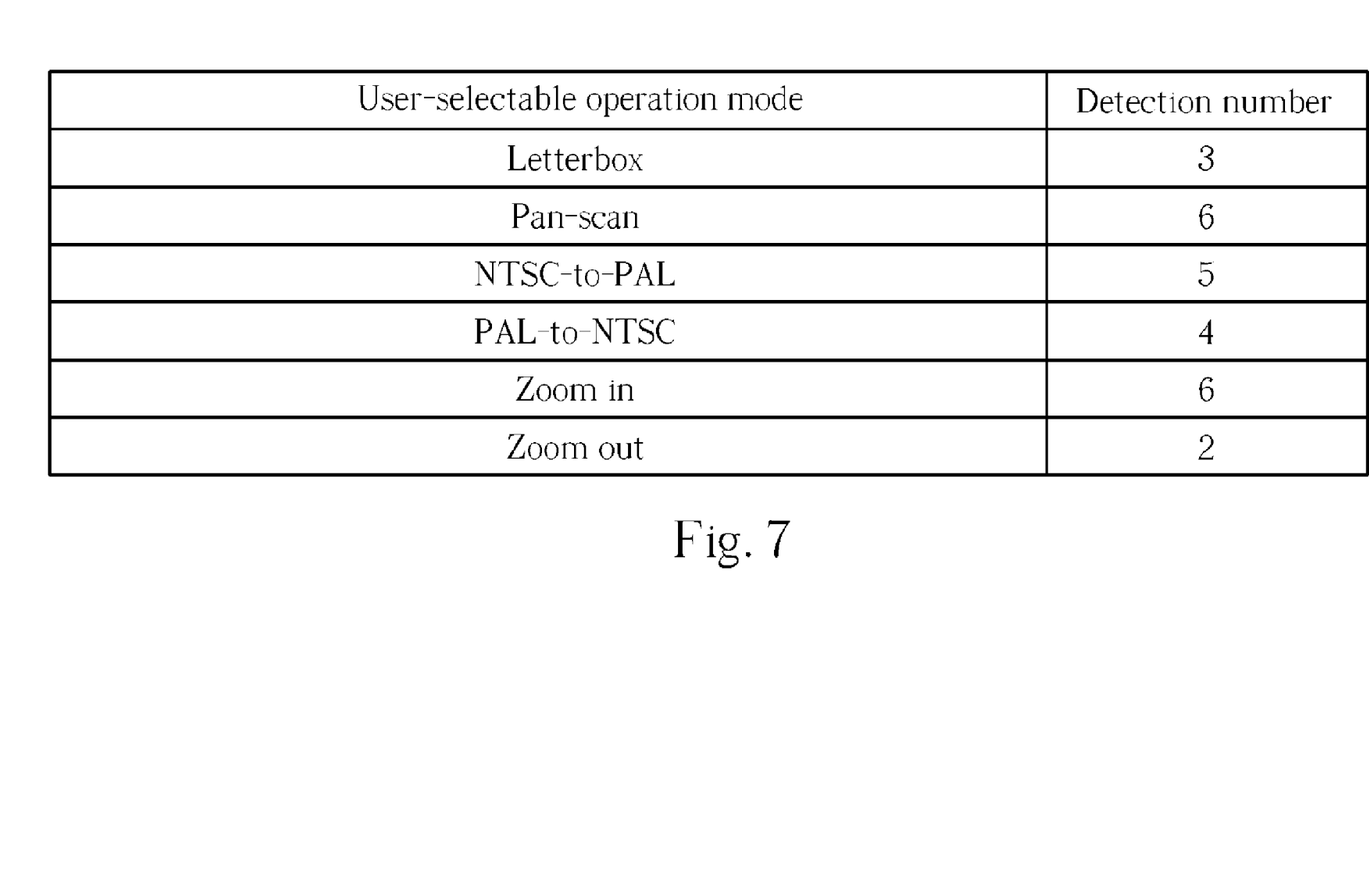
FIG. 7 shows a lookup table for determining the detection number according to the user-selectable operation mode.

The above-mentioned "user-selectable operation mode" could be a Letterbox mode, Pan-scan mode, PAL-to-NTSC conversion mode, NTSC-to-PAL conversion mode, zoom in mode or zoom out mode, etc. Each specific operation mode could corresponds to a specific detection number. It is also noted that the modes shown in FIG. 7 are only illustrative and not limiting.

In addition to FIG. 4, the mode control module 410 can also be implemented inside a memory controller (not shown in FIG. 4) of the scalable video format conversion system 400, to dynamically adjust the detection number according to the bandwidth workload of the memory controller. When the memory controller has a smaller bandwidth workload, the mode control module could set the detection number larger. When the memory controller has a larger bandwidth workload, the mode control module could set the detection number smaller.

Figure 8:
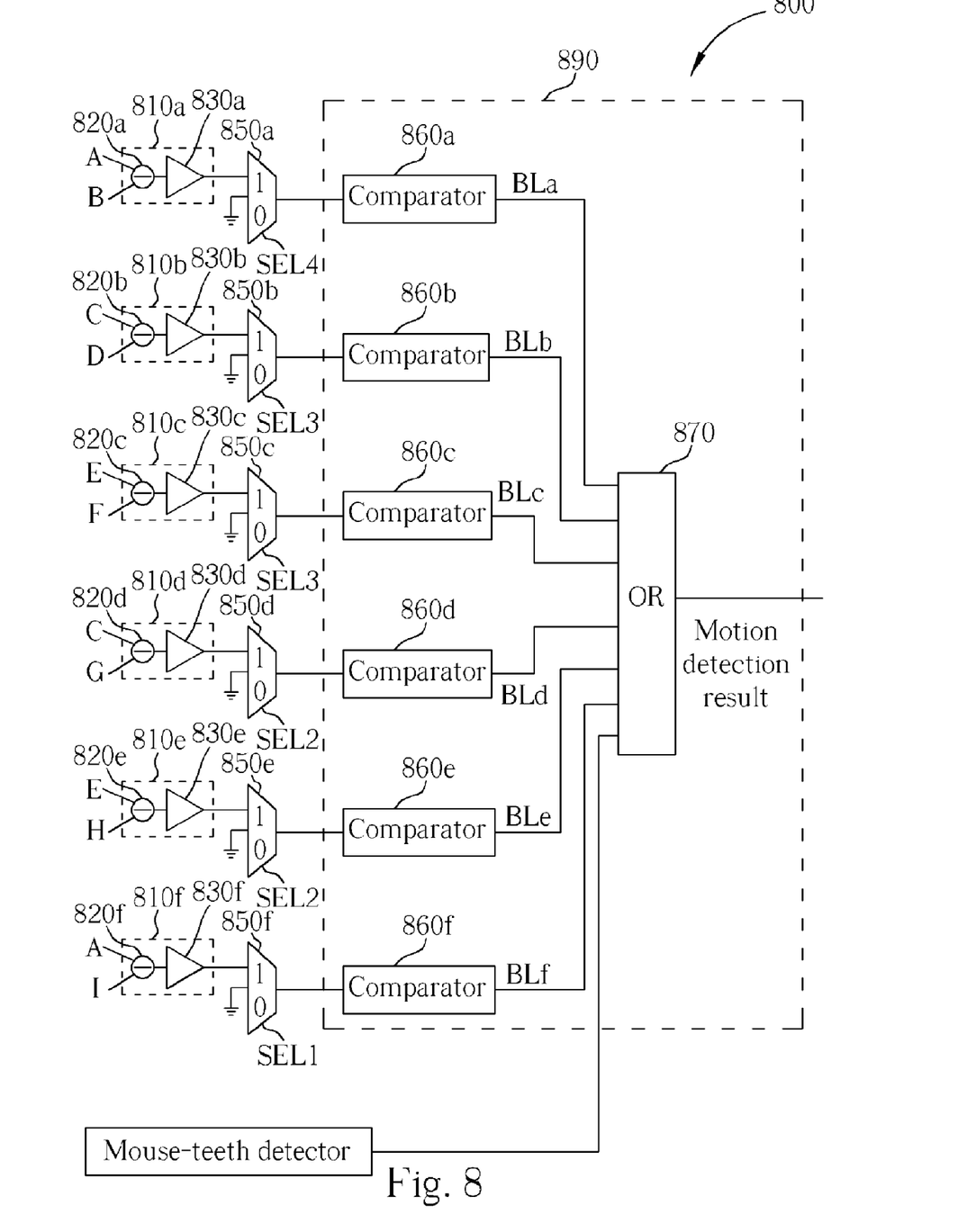
FIG. 8 shows a second embodiment of a variable-field motion detection apparatus according to the present invention.

As mentioned above, rather than containing five motion detectors as shown in the embodiment of FIG. 5, the variable-field motion detection apparatus 450 could also handle motion detection process with different numbers of video fields by itself. FIG. 8 shows a second embodiment of a variable-field motion detection apparatus 800 according to the present invention. The variable-field motion detection apparatus 800 processes motion detection process by accessing a plurality of video fields of an interlaced video signal to determine the motion situation of an image area. In this embodiment, the variable-field motion detection apparatus 800 comprises six pixel difference circuits 810a-f, a decision circuit 890, and six multiplexers 850a-f. As a whole, the multiplexers 850a-f could be regarded as a field-number adjuster. Each one of the pixel difference circuits 810a-f computes the pixel value difference between a point on two different video fields and generates a detection value as a result. Referencing the example shown in FIG. 3, in this embodiment the inputs of the pixel difference circuits 810 a-f are pixel values of points A, B, C, D, E, F, G, H, I shown in FIG. 3. Each of the pixel difference circuits 810a-f contains a subtracter 820a-f and an absolute value circuit 830a-f, which can be used to compute the absolute value of the difference between two pixel values. After a detection value of a pixel difference circuit passes through a corresponding multiplexer, a corresponding comparator will compare the detection value with a predetermined threshold, then generates a boolean value as a result. Please note that the predetermined thresholds used by the comparators 860a-f could have a common value or have different values. A logic OR operation is then preformed on these boolean values BLa-f to generate the motion detection result. In the above-mentioned situation, the variable-field motion detection apparatus 800 can be regarded as a 6-field motion detector.

However, 6-field motion detection is not necessary at all times. Hence the field-number adjuster can dynamically adjust the number of video fields used in motion detection process. For example, when 5-field motion detection is applied by the system, the value inputted to the comparator 860f will be set to '0' by the multiplexer 850f (which is part of the field-number adjuster). In this way, the T−3 field in FIG. 3 will have no influence on the motion detection result. When 4-field motion detection is applied by the system, the values inputted to comparators 860f, 860e, and 860d will be set to '0' by the multiplexers 850f, 850e, and 850d (which are all parts of the field-number adjuster). In this way, the T−3 and T+2 fields in FIG. 3 will have no influence on the motion detection result. Hence, it can be seen that by switching the multiplexers 850a-e properly, the variable-field motion detection apparatus 800 could adjusts the number of video fields used in motion detection process dynamically. Please note that, setting the values inputted to the comparators 860a-e to '0' by properly switching the multiplexers 850a-f is just an example. To adjust the number of video fields used in motion detection process, each value inputted to a comparator in FIG. 8 could also be set to any value smaller the threshold used by a corresponding comparator.

In addition, rather than being located between the pixel difference circuits 810a-f and the comparators 860a-f, the field-number adjuster (which includes the multiplexers 850a-f in FIG. 8 in this embodiment) could also be located between the comparators 860a-f and the logic OR circuit 870 to set some of the boolean values BLa-f to zero; or be located in front of the pixel difference circuits 810a-f to set some output end pairs to the same value. Above are some possible implementations of the field-number adjuster.

Sometimes motion detection with few number of video fields used will not be able to detect fast moving objects. In this situation the edges of a fast moving object might appear as ragged sawtooths rather than smooth curves. To solve this problem, the variable-field motion detection apparatus 800 of the present invention can also operate in conjunction with a mouse teeth detector (also called a sawtooth detector), as shown in FIG. 8, to prevent ragged sawtooths from appearing. For more details on sawtooth detectors, please refer to U.S. Pat. No. 5,625,421.

Figure 9:
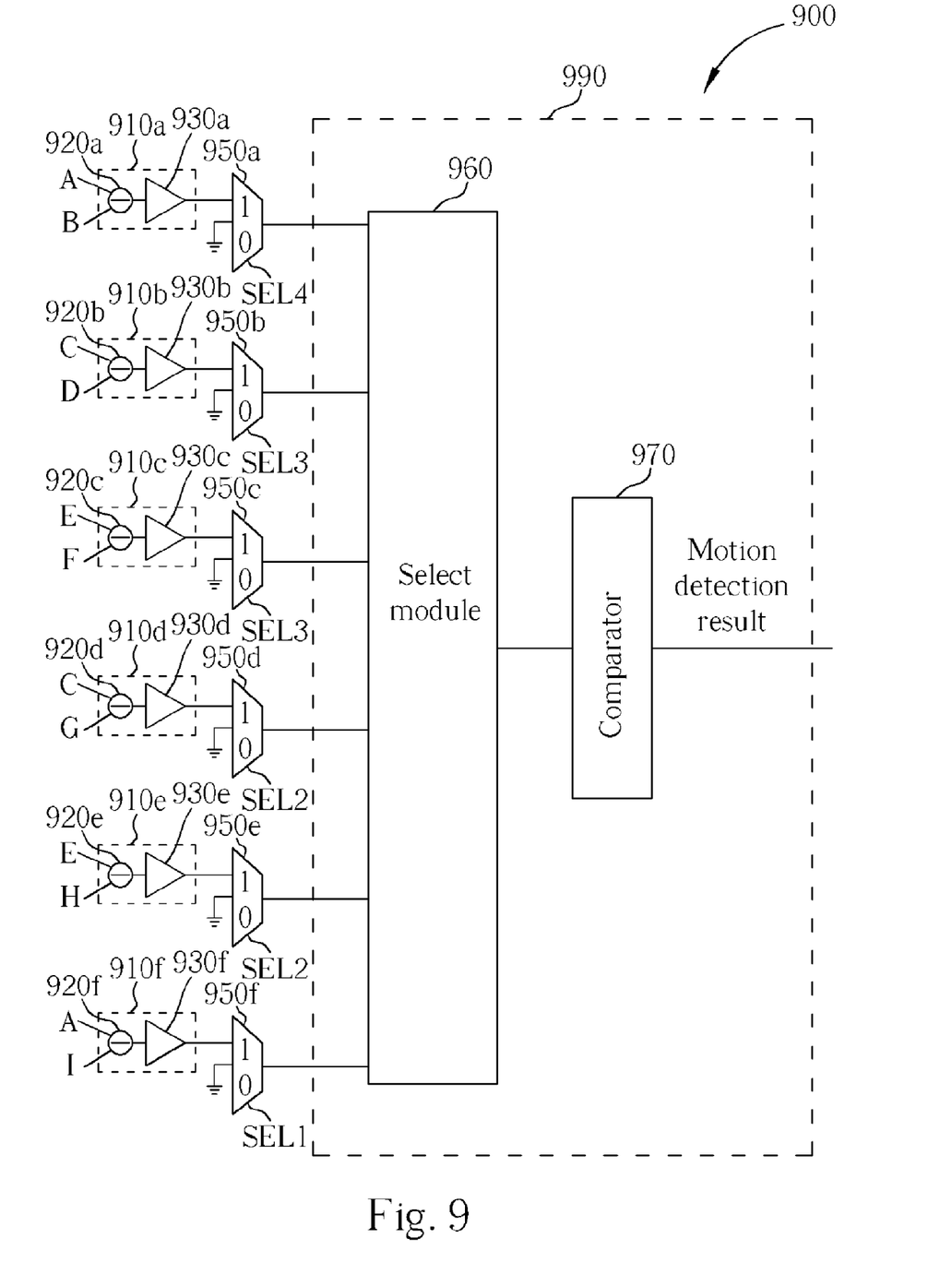
FIG. 9 shows a third embodiment of a variable-field motion detection apparatus according to the present invention.

FIG. 9 shows a third embodiment of a variable-field motion detection apparatus 900 according to the present invention. The main difference between the variable-field motion detection apparatuses 900 and 800 is that the select module 960 of decision circuit 990 selects a largest detection value output by the pixel difference circuits 910a-f. The comparator 970 can then compare the largest detection value with a predetermined threshold to get the final motion detection result. The multiplexers 950a-f, which could be regarded as a field adjuster, set some detection values output by the pixel difference circuits 910a-f to zero (or another value smaller than the predetermined threshold). Hence dynamically adjusting the used field number can be achieved. Please note that, rather than being located between the pixel difference circuits 910a-f and the select module 960, the field-number adjuster (which includes multiplexers 950a-f in this embodiment) could also be located in front of the pixel difference circuits 910a-f to set some input end pairs of some pixel difference circuits to the same value. For example, when the detection number is six, the field-number adjuster could pass pixel values on six different video fields to the inputs of the pixel difference circuits 910a-f. When the detection number is five, the field-number adjuster could set the two values inputted to the pixel difference circuits 910f as the same value, at this time only five video fields will affect the motion detection result. When the detection number is four, the field-number adjuster could set the two values inputted to the pixel difference circuits 910f as the same value, set the two values inputted to the pixel difference circuits 910e as the same value, and set the two values inputted to the pixel difference circuits 910d as the same value, at this time only four video fields will affect the motion detection result. Its apparent that through switching the field-number adjuster properly, the number of video fields used in motion detection process could be adjusted dynamically, according to the detection number determined by the mode control module 410. Furthermore, the variable-field motion detection apparatus 900 of this embodiment can also operate in conjunction with a mouse teeth detector as mentioned before.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A variable-field motion detector having access to a plurality of video fields of an interlaced video signal for detecting a motion situation of an image area in the interlaced video signal, the variable-field motion detector comprising:
   a plurality of pixel difference circuits, wherein each pixel difference circuit is for computing a detection value according to a difference between pixel values of a single pixel in two different video fields;
   a decision circuit coupled to the pixel difference circuits for determining the motion situation of the image area according to a plurality of detection values respectively computed by the pixel difference circuits; and a field-number adjuster, for adjusting the pixel difference circuits and/or the decision circuit to eliminate an effect of some video fields according to a detection number.

2. The variable-field motion detector of claim 1, wherein each pixel difference circuit comprises:
   a subtracter for computing the difference between the pixel values of the single pixel in two different video fields; and
   an absolute circuit coupled to the subtracter for computing an absolute value of an output signal of the subtracter as the detection value.

3. The variable-field motion detector of claim 1, wherein the decision circuit is for comparing each detection value with a related threshold to accordingly generate a boolean value, and then using a plurality of boolean values respectively corresponding to the detection values to compute the motion situation of the image area.

4. The variable-field motion detector of claim 3, wherein the field number adjuster is for setting some of the detection values to be smaller than the related thresholds according to the detection number.

5. The variable-field motion detector of claim 3, wherein the field number adjuster is for setting some of the boolean values to be zero according to the detection number.

6. The variable-field motion detector of claim 1, wherein the decision circuit is for generating a maximum detection value according to the detection values, and then comparing the maximum detection value with a threshold to determine the motion situation of the image area.

7. The variable-field motion detector of claim 6, wherein the field number adjuster is for setting some of the detection values to be smaller than the threshold according to the detection number.

8. The variable-field motion detector of claim 1, wherein the field number adjuster is for setting two input values of some of the pixel difference circuits to be the same value according to the detection number.

* * * * *